United States Patent
Craver et al.

(10) Patent No.: US 6,556,723 B2
(45) Date of Patent: Apr. 29, 2003

(54) DISPLAYING ORDERED IMAGES BASED ON A LINEARIZED DATA STRUCTURE

(75) Inventors: Scott A. Craver, Princeton, NJ (US); Boon-Lock Yeo, Sunnyvale, CA (US); Minerva Yeung, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 09/777,164

(22) Filed: Feb. 5, 2001

(65) Prior Publication Data

US 2001/0014181 A1 Aug. 16, 2001

Related U.S. Application Data

(62) Division of application No. 09/150,496, filed on Sep. 9, 1998, now Pat. No. 6,233,367.

(51) Int. Cl.[7] .................................................. G06K 9/32
(52) U.S. Cl. ...................................... 382/294; 382/298
(58) Field of Search ................................. 382/305–306, 382/294, 302, 100; 707/4–12, 100–104

(56) References Cited

U.S. PATENT DOCUMENTS 5,911,139 A * 6/1999 Jain et al. ........................ 707/3

OTHER PUBLICATIONS

Chen et al. "ViBE: a new paradigm for video database browsing and search" Proc. IEEE Workshop on content–Based Access o Image and Video Libraries, p. 96–100, Jun. 1998.*

Kuan et al. "Fast k nearest neighbour search for R–tree family" Proc. of 1997 International Conference on Information, Communications and Signal Processing, vol. 2, pp. 924–928, Sep. 1997.*

Chen et al., Similarity Pyramids for Browsing and Organization of Large Image Database. Proc. Of SPIE/IS&T Conf. On Human Vision and Electronic Imaging III, Jan. 26, 1998, vol. 3299, pp. 563–575.

Parodi et al. Distributed key–generation structures for associative image–classification. Proc. Of IEEE International Symposium on Citrcuits and Systems, May 3, 1992, vol. 3, pp. 1549–1552.

Karamata et al. Interactive analysis of multi–spectral images using a Hilbert curve. Proc. OF 12th IAPR International Conference on Pattern Recognition, Oct. 9, 1994, vol. 1, pp. 93–97.

Kuan et al. Fast k nearest neighbour search for R–tree family Proc. Of 1997 International Conference on Information, Communications and Signal Processing. Sep. 1997 pp. 924–928.

Kamata, et al., "Interactive Analysis Method for Multidimensional Images Using a Hilbert Curve", System Computing in Japan, vol. 26, pp. 83–92, 1995.

Falotusos et al. Fractals for Secondry Key Retrieval, Technical Report CS–TR–2242. Univ. of Maryland Institute for Advanced Computer Studies, May 1989. pp 1–17.

Berchtold et al. Fast parallel similarity search in multimedia database, Proc. Of the ACM SIGMOD international conference on management of data, May 1997, pp. 1–12.

Asano, et al., "Space Filling Curves and Their Use in the Design of Geometric Data Structures", in Latin '95: Theoretical Informatics, pp. 36–48.

Forsyth, et al., "Searching for Digital Pictures", Scientific American, Jun. 1997, pp. 88–93.

K. Musgrave, A Peano Curve Generation Algorithm:, in Graphicas Gems II, p. 25, 1991.

A. Butz, "Convergence with Hilbert's Space Filling Curve", J. Computer and System Science, vol. 3, pp. 128–146, May 1969.

D. Voorhies, "Space–filling Curves and a Measure of Coherence", in Graphics Gems II, pp. 26–30.

* cited by examiner

*Primary Examiner*—Jingge Wu
(74) *Attorney, Agent, or Firm*—Blakley, Sokoloff, Taylor & Zafman LLP

(57) ABSTRACT

A system and method is provided for using a linearized data structure to display a set of ordered images. The images are ordered based on the attributes of the images. The system and method includes displaying a target image and related images on a graphical user interface, where the related images are near the target image in the linearized data structure. The relative sizes of the target image and the related images may reflect the similarity of the related images to the attributes of the target image.

30 Claims, 8 Drawing Sheets

FIRST ORDER

SECOND ORDER

THIRD ORDER

FOURTH ORDER

FIRST ORDER  SECOND ORDER  THIRD ORDER

DISPLAYING ORDERED IMAGES BASED ON A LINEARIZED DATA STRUCTURE

This application is a divisional of prior U.S. patent application Ser. No. 09/150,496, now U.S. Pat. No. 6,233, 367, filed on Sep. 9, 1998. This application is also related to copending U.S. patent application Ser. No. 09/777,165, filed on Feb. 5, 2001.

BACKGROUND OF THE INVENTION

1. Field of the Invention

The described invention relates to the field of data management. In particular, the invention relates to displaying ordered images.

2. Description of Related Art

Browsing is a technique that users employ to view information rapidly for deciding whether the content is relevant to their needs. Browsing should give the user quick access to view the content and focus on sections of further interest. Multiple images are typically displayed. The user is able to scroll through the images until the desired image is found.

It is difficult, however, to characterize and sort images based on attributes of the images. While certain images may be closely related by one attribute, they may not be closely related by other attributes. Additionally, if many images are stored in a data structure, the amount of time to either place an image into the data structure or retrieve an image from the data structure can become excessive, such that a user will not want to wait.

DETAILED DESCRIPTION

Figure 1:
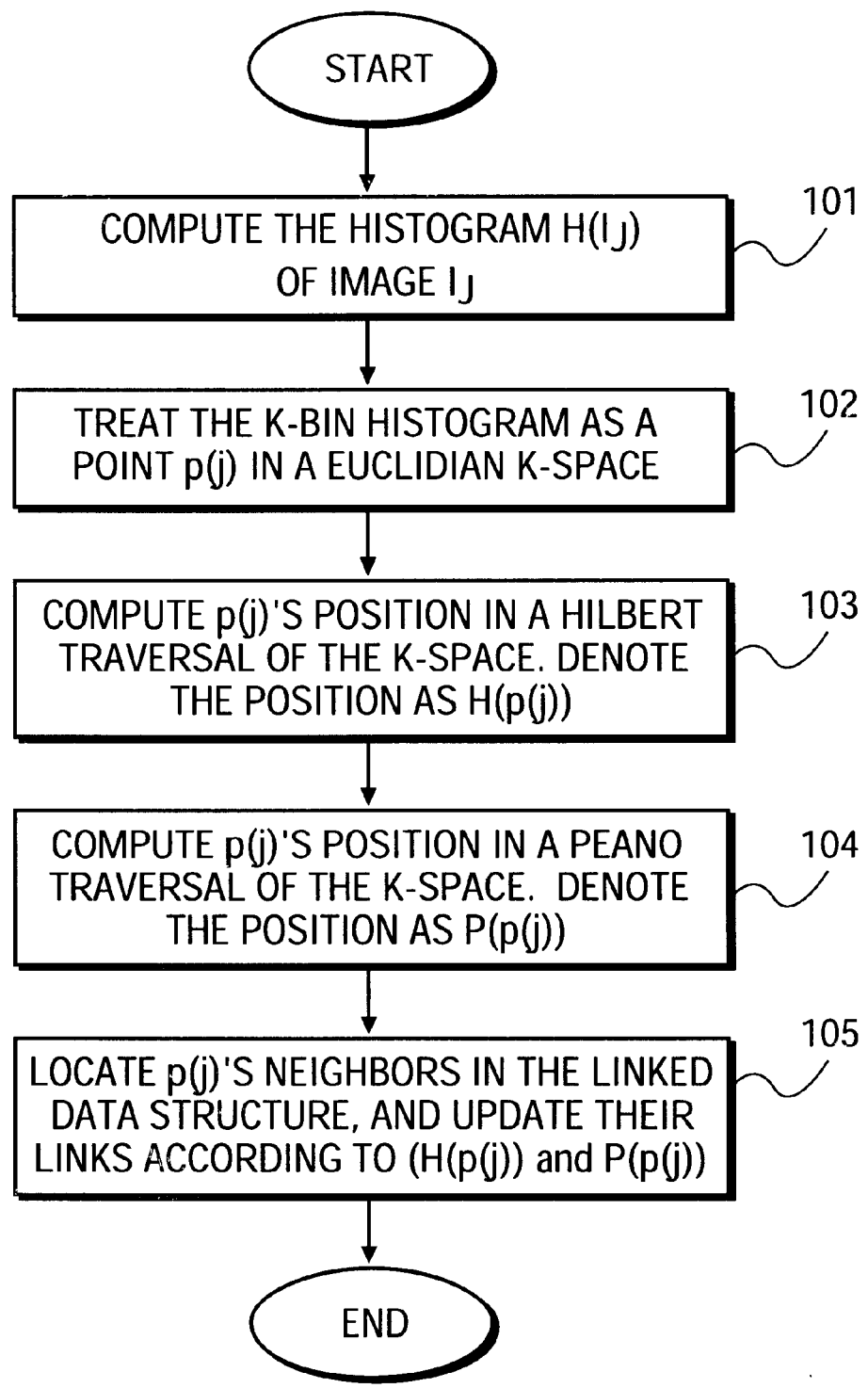
FIG. 1 shows one embodiment of a flowchart of the process of creating dual linearizations for each image.

A method of characterizing images that scales well for large amounts of A method of characterizing images that scales well for large amounts of images is described. Due to the large number of attributes by which an image may be categorized, up until this disclosure, it has been difficult to categorize and display like images in an efficient manner. The present invention provides for display of images based on multiple linearizations of the images, such as a first linearization and a second linearization. "Linearization," in this application, implies not just an ordering of a set of points, but also storing their positions, or at least relative distances between their positions. In one embodiment, the linearizations are performed by traversing two space-filling curves. In another embodiment, the linearizations are performed by traversing a cluster data structure. More than two linearizations may be displayed.

The method described herein is scaleable, so that the amount of time to categorize and display a portion of a set of images does not change significantly whether the set of images is relatively small (e.g., a few hundred images) or relatively large (e.g., greater than 50,000 images).

Two effective methods for linearizing the images are described: a space-filling curve method and a clustering method. Other methods, however, can also be used to linearize the images.

Space Filling Curves

An image may be categorized by various attributes, or components, of the image. For example, an image can be broken down and characterized by color information, shape information, size information, texture information, objects represented, or based on other content of the image. The image may also be categorized by tag information, which is information associated with each image, but which may not be part of the image itself. Tag information may include annotation information, audio information, time stamp information, global position information (GPS), and so forth.

In one example, a histogram of an image is generated using 600 different color bins. The histogram includes the number of pixels corresponding to each of the 600 colors used.

In one embodiment, each of the components of the histogram is used to map the image to a coordinate in N-dimensional space. For this example, N is 600. Image 1, for example, is mapped to the coordinate:

<attribute1, attribute2, attribute3, . . . attribute N> in N-dimensional space, where attribute 1 is the number of pixels corresponding to a first color, attribute 2 is the number of pixels corresponding to a second color, and so forth.

Multiple images may be mapped into the N-dimensional space. Images that are located close together in the N-dimensional space are closely related by their attributes. In contrast, those that are located farther apart in the N-dimensional space are less closely related by their attributes.

One method that has been used for ordering a set of images mapped into N-dimensional space is by mapping all of the images to an arbitrary line. The position on the line to which the images are mapped indicates the linearization of the images. This linearization, however, does not preserve the relationship of similarly attributed images. This is because the mapping of the N-dimensional space into a one dimension line does not maintain information about how closely images are related in the N-dimensional space.

One embodiment of the present invention linearizes the images using a space-filling curve to help maintain the relationship of like images. A space-filling curve is a continuous path that visits every point in a k-dimensional space. The space-filling curve provides a way to linearize the points in the multi-dimensional space.

Space-filling curves have been studied for many years, and more recently have interested computer scientists. For example, see "Fractals for Secondary Key Retrieval" by C. Faloutsos and S. Roseman (Technical Report CS-TR-2242, University of Maryland Institute for Advanced Computer Studies, May 1989) for an example of the use of space-filling curves. There are several different types of space filling curves including the Hilbert curve, the Peano curve, the Sierpinski curve, the Lebesgue curve, and the Schoenberg curve. See Hans Sagan, "Space-Filling Curves," Springer-Verlag, 1994, for more information on space-filling curves.

Figure 7:
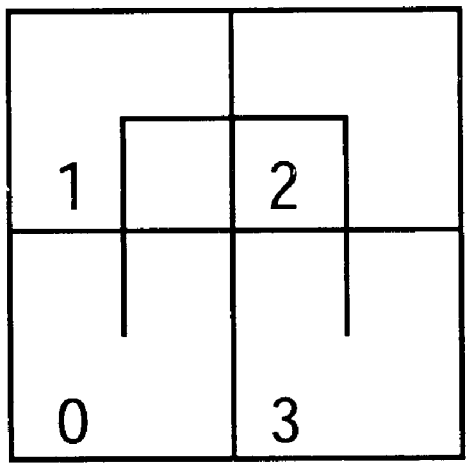
FIG. 7 shows the 1st, 2nd, 3rd and 4th orders of a two-dimensional Hilbert curve.
Figure 7:
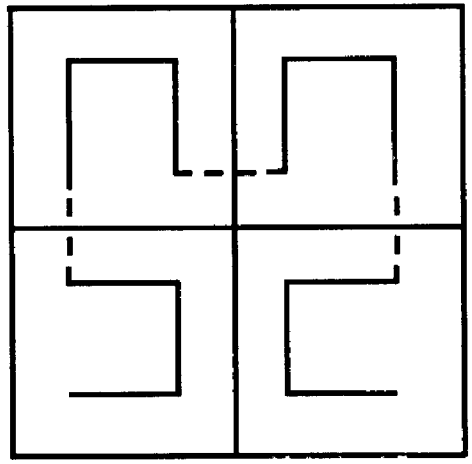
Figure 7:
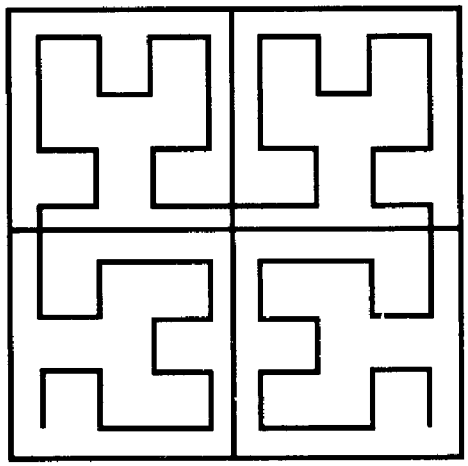
Figure 7:
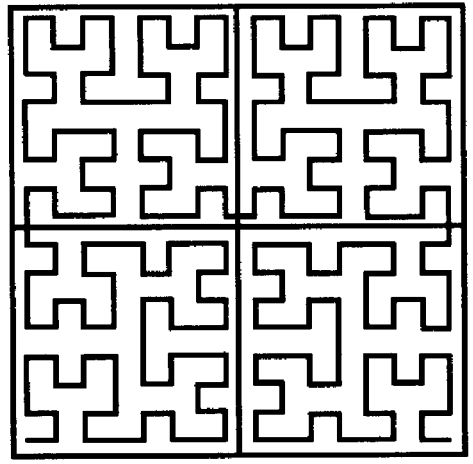

FIG. 7 shows the 1st, 2nd, 3rd and 4th orders of a two-dimensional Hilbert curve. The procedure to derive higher orders of the Hilbert curve is to rotate and reflect the curve at vertex 0 and at vertex 3. The curve can keep growing recursively by following the same rotation and reflection pattern at each vertex of the curve.

Figure 8:
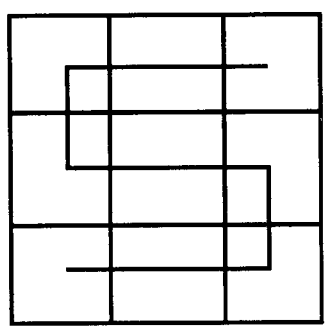
FIG. 8 shows the 1st, 2nd, and 3rd orders of a two-dimensional Peano curve.
Figure 8:
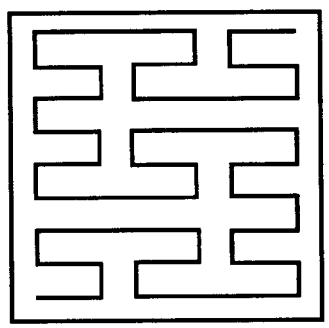
Figure 8:
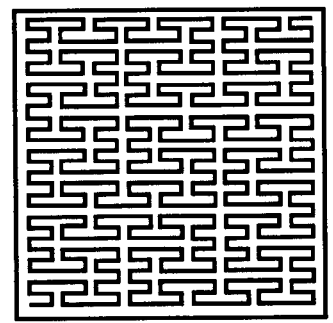

FIG. 8 shows the 1st, 2nd, and 3rd orders of a two-dimensional Peano curve. The procedure to derive higher orders of the Peano curve is to replace each vertex of the basic curve with the previous order curve. The Hilbert curve and Peano curves can be extended into multiple dimensions, as is well-known in the art.

Space filling curves have the property that the points that are close to each other on the space-filling curve are also close to each other in the multi-dimensional space. However, the opposite is not true: the points that are close to each other in the multi-dimensional space are not necessarily close together on the space-filling curve.

Figure 2:
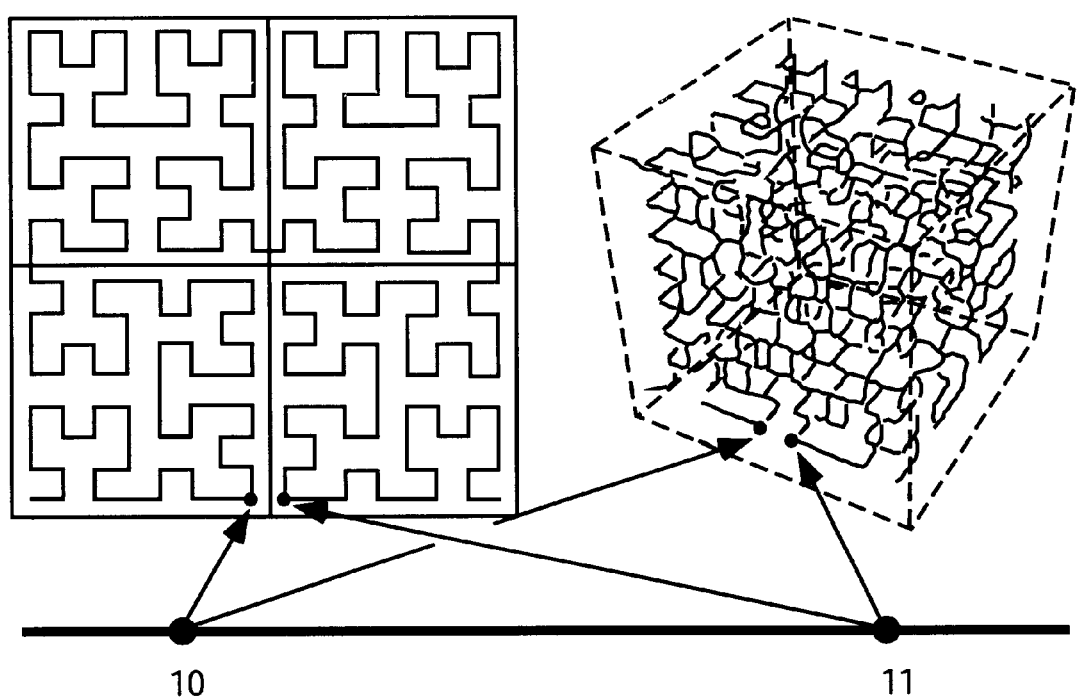
FIG. 2 shows an example of a space-filling curve.

FIG. 2 shows an example of a two-dimensional and three-dimensional space-filling curve. In this case, an N-dimensional Hilbert curve is employed. Two points 10 and 11 that are close to each other in the multi-dimensional space lie close to a partition boundary separating two sections of the multi-dimensional space. When the curve is traversed as shown at the bottom of FIG. 2, the points that were close in space map to points that lie far apart in linearization. This undesirable distancing of close points occurs at, and because of, partition boundaries of the Hilbert and Peano curves.

Figure 3:
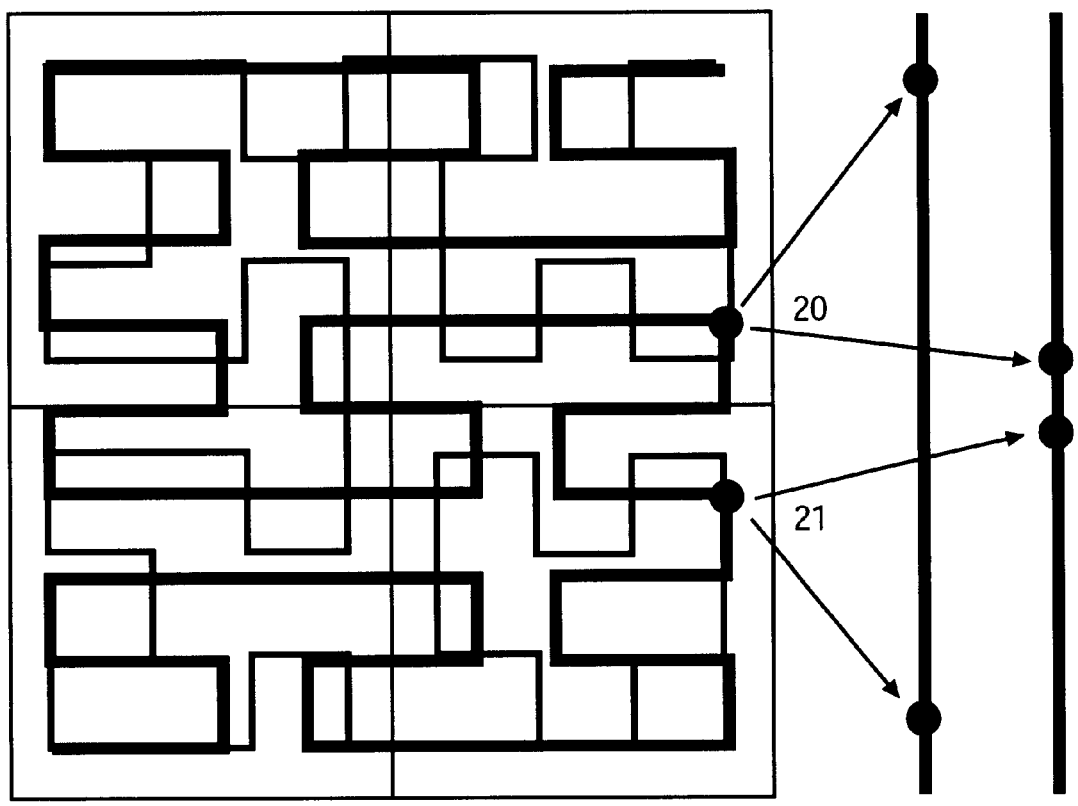
FIG. 3 shows an embodiment in which a second curve is employed to improve the reliability of providing images that are close together in the multi-dimensional space.

FIG. 3 shows an embodiment in which a second curve is employed to improve the reliability of providing images that are close together in the multi-dimensional space. In one embodiment, a Peano curve is used to complement a Hilbert curve. The Peano and Hilbert curves are constructed such that their partition boundaries, where undesirable results are likely to happen, occur in different locations. Points 20 and 21 that lie close in space will likely end up close together in either the Hilbert curve or the Peano curve, as shown in FIG. 3.

Table 1 shows an example of a computer program written in C language that maps a point in N-dimensional space to a position on a one-dimensional traversal of a Hilbert curve and a position on a one-dimensional traversal of a Peano curve. In one embodiment, the code maps the point in N-dimensional space to an interval between 0 and 1. The output of the program is a bit pattern identifying a number between 0 and 1 for each image being analyzed. As other images are converted into other bit patterns between 0 and 1, a database is set up with a first linearization based upon the Hilbert curve and a second linearization based upon the Peano curve.

In one embodiment, for simplification, images that map to a partition boundary are adjusted slightly so that they do not fall directly on the partition boundary. This is done because a curve may hit points on a partition boundary multiple times. In a Hilbert curve, the partition boundaries are at points that are any multiple of ½, ¼, ⅛, ¹⁄₁₆, etc, of the N-dimensional space. In a Peano curve, the partition boundaries are at points that are any multiple of ⅓, ⅑, ¹⁄₂₇, etc., of the N-dimensional space.

TABLE 1

```
/****************************************************************
©   Intel Corporation, 1998
    Pseudo-code for collapsing points in a space to points in a line,
    via space-filling curve traversal.
    The "points" are arrays of plain old integer coordinates. These are
    combined to produce a single value, indicating a position along a line.
    Since we're dealing with high-dimensional spaces (DIMENSION == ~600),
    the final value will have hundreds of digits, and we construct a
    special datatype to hold it.
****************************************************************/
BEGIN
        for each image I, BEGIN:
                Compute I's n-bin color histogram, H
                Normalize H to a standard number of pixels
                Convert H to an n-dimensional vector, V
                Call Hctol( V ) to print out position of V along
                        a Hilbert curve traversal.
                Call Pctol( V ) to print out position of V along
                        a Peano curve traversal.
        END
        Sort images along Hilbert curve positions: output sorted list
        Sort images along Peano curve positions: output sorted list
        /* These two orderings can then be used to generate Browser Windows */
END
/*
 *   function: hilbert_cube_to_line --- Hctol
 *             Collapses m-dimensional coordinates to a line via
 *             Hilbert curve traversal
 */
function Hctol( point )
{
    integer tau,    /* chunk of digits of final line position */
            lasttau;    /* holder for previous value of tau       */
        integer i, j, k,    /* counters                       */
            lastbit=0,
                one, zero,
                r=0, b=0,
```

TABLE 1-continued

```
            DEGREE=19; /* DEGREE == number of bits precision per coordinate */
    FOR i = DEGREE .. 1
    {
        /* Extract tau from all the coordinate values */
        FOR j = 1 .. DIMENSION
            {
                SET j'th bit of tau = i'th bit of point[j]
            }
            SWAP tau and lasttau;
        XOR tau with lasttau;
        ROLL tau r bits to the left;
        tau—>end = (tau—>end + roller)%DIMENSION;
        /* twiddle bits in tau */
            if( lastbit == 0 )
                    TOGGLE first bit of tau: replace 1 with 0, 0 with 1;
        TOGGLE b'th bit (from the left) of tau;
        /* Avalanche and send digits to the output buffer */
        for( j = 1..DIMENSION ) {
                COMPUTE k = the XOR of the first j bits of tau;
                OUTPUT k;
            if(k==1) one=j;
                    else zero=j;
        }
        /* compute b */
        SET lastbit = k;
            if( lastbit == 0 )
                    b=DIMENSION-one;
            else
                    b=DIMENSION-zero;
        COMPUTE r = (r+DIMENSION-1-b) % DIMENSION;
    }
}
/*
 *  function: peano_cube_to_line
 *          Collapses m-dimensional coordinates to a line via
 *          Peano curve traversal
 */
void Pctol( point )
{
    int i, j, trit, flag=0, DEGREE=12;
    int modulus, h=0;
    int flags[2048];      /* flags are used to determine which way
                             the curve winds at any given point */
    FOR all i, SET flags[i]=0;
    FOR i = DEGREE .. 1
        FOR j = DIMENSION .. 1
            {
            flag = flag XOR flags[j];
            trit = i'th digit of point[j] /* This is in base 3, so trit
                                             takes on values 0, 1, or 2 */
            if( trit==1 ) INVERT flag[j];
            else
                    if( flag is TRUE )
                            SET trit = 2-trit; /* Sets 2 to 0, or 0 to 2 */
            OUTPUT trit;
            SET flag = flag XOR flags[j];
            }
    }
}
/*
    Source code for collapsing points in a space to points in a line,
    via space-filling curve traversal.
    The "points" are arrays of plain old integer coordinates. These are
    combined to produce a single value, indicating a position along a line.
    Since we're dealing with high-dimensional spaces (DIMENSION == ~600),
    the final value will have hundreds of digits, and we must construct a
    special datatype to hold it.
*/
#include <stdio.h>
#define MAXD 700
#define DIMENSION length
#define SIDELENGTH 531441
/*                              */
/* Code to handle the numeral datatype */
/*                              */
typedef struct numeral{
            char d[MAXD];           /* At most MAXD digits    */
        int end;        /* position of highest digit */
} * numeral;
```

TABLE 1-continued

```
char hopper[10];
int hopsize, hopcount, hopmod;
/* Ninit --- allocates a numeral and sets its value to 0 */
numeral ninit( int length )
{
    numeral done; int i;
    if( (done=(numeral)malloc(sizeof(struct numeral)))==NULL )
        { fprintf(stderr,"Numeral allocation problem.\n"); exit(1); }
    for(i=0; i<MAXD; i++) done—>d[i]='0';
    done—>end=DIMENSION-1;
    return done;
}
/*  Hopperhead --- initializes the "hopper." More on this below */
void hopperhead( int size, int mod )
{
    hopsize=size; hopmod=mod; hopcount=0;
}
/*  Hop --- pours digits into a "hopper," emptying the whole thing
 *           when it becomes full.
 *
 *
 *  The hopper is a small buffer of digits in some small base b, such
 *  as 2 or 3. These digits are generated by the curve-mapping functions,
 *  in the form of very large binary/ternary numbers. We don't want to
 *  store all that in a file, so the hop function conglomerates N base-b
 *  digits into a single digit base N*b before printing it to standard out.
 *
 */
void hop( int c )
{
    int i,j;
    if(c != 0) hopper[hopcount++]=(char) c;
    if( hopcount >= hopsize || c==0 ){ /* Dump hopper in base-n format */
        for(i=j=0; j<hopcount; j++)
            i = i*hopmod + hopper[j]-'0';
        printf("%c", i+' '+1);
        hopcount=0;
    }
}
/*
 *  function: hilbert_cube_to_line
 *            Collapses m-dimensional coordinates to a line via
 *            Hilbert curve traversal
 *
 *            This function accepts an array of integers (coordinates)
 *            and converts it to a position along a line, sending the
 *            digits to an output buffer which eventually prints to
 *            standard output.
 */
void Hctol( int * v, int length )
{
    numeral tau, lasttau;
    int i, j, k, one, zero, lastbit=0, lastbyte=0, roller=0, DEGREE=19;
    tau=ninit(DIMENSION);      lasttau=ninit(DIMENSION);
    hopperhead(6,2);           /* Set up hopper: Base 2, */
                               /* Buffer of six digits max */
    for( i=1<<(DEGREE-1); i>0; i>>=1 )
    {
        /* Extract tau from all the coordinate values */
        for( j=0; j<DIMENSION; j++ )
            tau—>d[j] = ((v[j]&i)==0) ? '0' : '1';
        tau—>end=DIMENSION-1;
        /* Perform: tau ^= lasttau; lasttau ^= tau; */
        for( j=0; j<DIMENSION; j++ ) {
            k=tau—>d[j];
            tau—>d[j] ^= ( lasttau—>d[j] & 1 );
            lasttau—>d[j]=k;
        }
        /* Roll the value of tau "roller" bits to the left */
        tau—>end = (tau—>end + roller)%DIMENSION;
        /* twiddle bits in tau */
            if( lastbit==0 ) tau—>d[(tau—>end+1)%DIMENSION[ ^= 1;
        tau—>d[(tau—>end+1+lastbyte)%DIMENSION] ^= 1;
        /* Avalanche and send digits to the output buffer */
        for( j=k=0, one=zero=DIMENSION-1; j<DIMENSION; j++ ) {
            hop( tau—>d[(tau—>end+1+j)%DIMENSION] ^ k );
            k ^= ( tau—>d[(tau—>end+1+j)%DIMENSION] & 1 );
            if(k) one=j; else zero=j;
        }
```

TABLE 1-continued

```
        /* compute lastbyte */
            if( lastbit=k ) lastbyte=DIMENSION-1-zero;
                else lastbyte=DIMENSION-1-one;
        roller = (roller+DIMENSION-1-lastbyte) % DIMENSION;
    }
    hop(0);     /* flush the output buffer */
    free(tau); free(lasttau);
}
/*
 * function: peano_cube_to_line
 *          Collapses m-dimensional coordinates to a line via
 *          Peano curve traversal
 *
 *          This function accepts an array of integers (coordinates)
 *          and converts it to a position along a line, sending the
 *          digits to an output buffer which eventually prints to
 *          standard output.
 */
void Pctol( int * v, int length )
{
    int i, j, trit, flag=0, DEGREE=12;
    int modulus, h=0;
    int flags[2048];
    hopperhead(4,3);            /* Set up hopper: base-3, */
                                /* Buffer of 4 digits max */
    for(i=0; i<2048; i++) flags[i]=0;
    for( modulus=SIDELENGTH/3, i=DEGREE-1; i>=0; i--, modulus /= 3){
        for( j=DIMENSION-1; j>=0; j-- ){
            flag ^= flags[j];       /* XOR-out current flag */
            trit = (v[j]/modulus)%3;    /* Get current base-3 digit */
            if( trit==1 ) flags[j] ^= 1;    /* Invert current flag, or: */
            else if( flag ) trit = 2-trit;  /* maybe invert the digit */
            hop( trit+'0' );        /* Send digit to output */
            flag ^= flags[j];       /* XOR-in the new flag value */
        }
    }
    hop(0);                         /* Flush output buffer */
}
```

FIG. 1 shows one embodiment of a flowchart of the process of creating dual linearizations for each image. At step 101, a histogram H(Ij) is created of image Ij. One implementation of the histogram is by using color information. Other feature information like shape and size can also be implemented, and can be in the form of histogram or other feature representation.

Essentially, any image content that can be represented as a vector (a point in space) may be used. Points "close" to one another are similar in that particular kind of content. Once the set of images is converted into a set of points, the rest of the process is the same: traverse the "space" along the two curves, and output the data structure.

At step 102, the histogram of k attributes is mapped as a point p(j) in k-dimensional space, where k is any positive integer. At step 103, the position of p(j) is computed in a Hilbert traversal of the k-space. In one embodiment, the position of p(j) is computed along an interval [0,1] in a Hilbert traversal of the k-space. At step 104, the position of p(j) is computed along interval [0,1] in a Peano traversal of the k-space. At step 105, p(j)'s four nearest neighbors based on the values obtained from the Hilbert and Peano curve traversals are located. Their links are updated according to the positions of the images.

In one embodiment, a linked data structure is used to store each image as it is linearized. For example, a new image is placed into a first linked structure by its linearization based on the Hilbert curve traversal. The new image is linked to its nearest neighbor, i.e., the images closest to the new image in linearization. The new image is similarly placed into a second linked structure by its linearization based on the Peano curve traversal.

Once all the images are added to the data structure, it is possible to follow a first set of links to traverse the linearization based on the Hilbert traversal. It is also possible to follow a second set of links to traverse the linearization based on the Peano traversal. In another embodiment, linearizations based on other methods can be employed. Additionally more than two linearizations may be used.

One advantage of using the described data structure is that it does not need to be completely recalculated each time an image is added or deleted from the data structure. Instead, only a few links need to be modified for each addition or deletion of an image. A second advantage of the data structure is that it is data independent, so that two existing databases can be combined into one with little more than a simple list merge.

Clustering

Clustering is another method of providing a linearization to images. A cluster is a grouping of images using a tree-like structure. The nature of clusters is such that it is not unusual that like images are placed into the data structure at the same time. By performing a linearization based upon a smart traversal of the cluster, like images are more likely to be placed next to each other in the linearization.

One way of linearizing a cluster is to add an entire first group of images before traversing the cluster to add another group of images. For example, if a first group of images was all added to the cluster at the same time, these images should be linked together prior to moving on to a group of images that was added to the cluster at a different time than the first group.

In another embodiment, the attributes of the target image are compared with attributes of all groups of the cluster. The groups that are the closest in attributes are linearized first. Other groups are added based on their similarity in attributes. A centroid, or representative item having the average characteristics of an entire group, can be used to compare the target image with an entire group within the cluster.

Another way to perform a linearization is to traverse the cluster in an orderly fashion. For example, a first linearization can traverse the cluster taking all right branches prior to taking any left branches. A second linearization can traverse the cluster taking all left branches. Alternatively, a first linearization can alternate between right and left branches, and a second linearization can alternate in the opposite manner.

In another embodiment, multiple linearizations can be created by first performing a first traversal of a cluster by traversing a first random traversal of the cluster linearizing each of the images of a section before moving on to a different section. A second traversal of the entire cluster is then performed by a different random traversal of the cluster.

Display of Multi-linearizations

Figure 4:
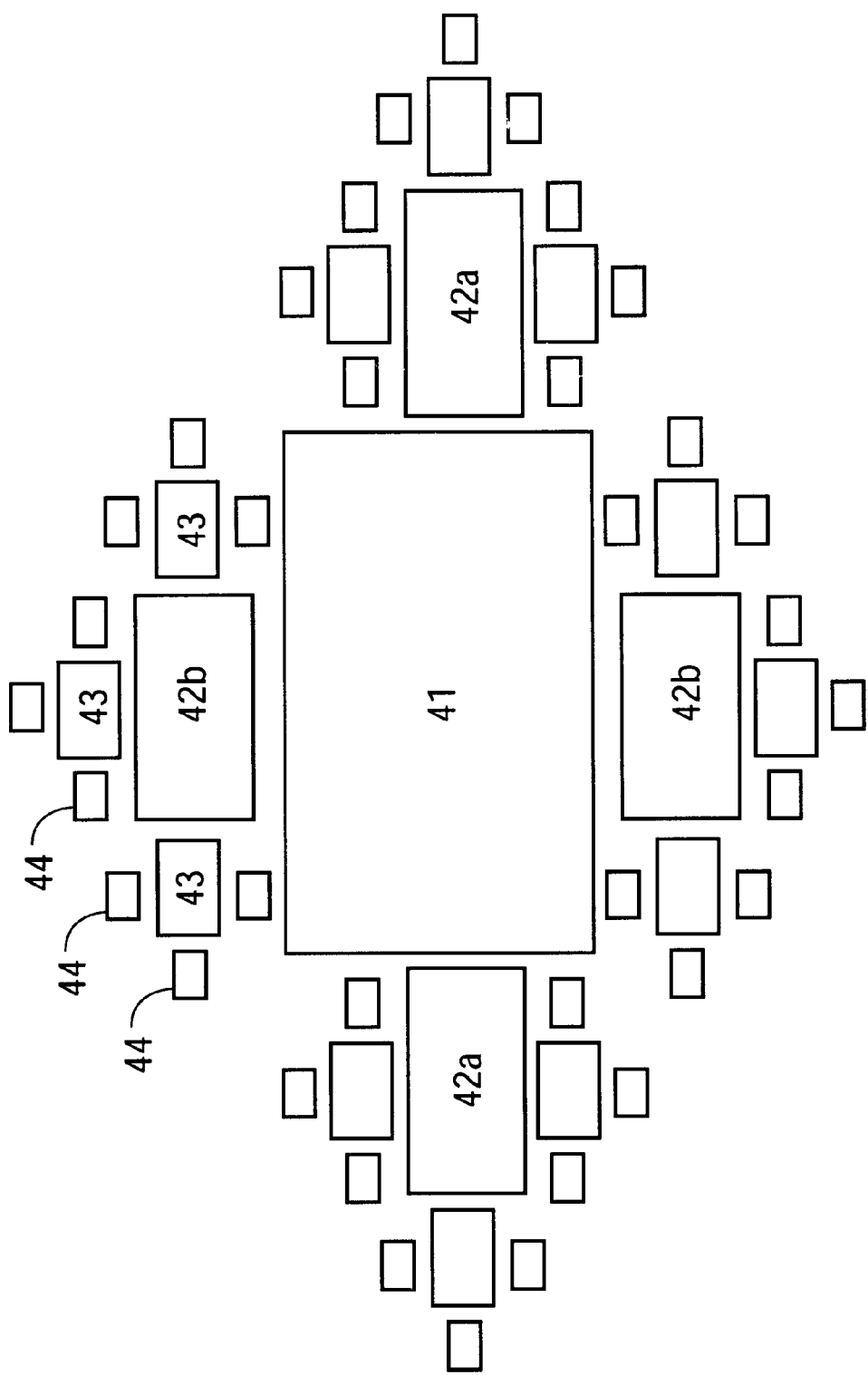
FIG. 4 shows an example of a browser interface based on a dual linearization.

FIG. 4 shows an example of a browser interface based on a dual linearization. In this implementation, a total of 53 images are displayed at a time. The current image of focus, or the target image, is centered in the display. The images immediately to the left and right are the nearest neighbors 42a in one linearization. The images immediately to the top and bottom are the nearest neighbors 42b in a second linearization.

The nearest neighbors are the images closest to the target image in linearization. In the case of the space-filling curves, the nearest neighbors correspond to the points that are closest in position in a linearization to the point corresponding to the target image. In one embodiment, the first linearization may be based on a Hilbert curve, and the second linearization may be based on a Peano curve. In a second embodiment, the first linearization is based on a first traversal of a cluster data structure, and the second linearization is based on a second traversal of the cluster data structure.

In one embodiment, the rules of displaying nearest neighbors of an image are applied recursively to all other images. Additionally, in one embodiment, images further away from the center, or target image, are displayed with a smaller size to denote greater dissimilarity from those images closer to the center. In FIG. 3, the next nearest neighbors 43 to the target image are smaller than the nearest neighbors 42a and 42b. The next-next nearest neighbors 44 of the target image are even smaller then its next nearest neighbors 43.

Figure 5:
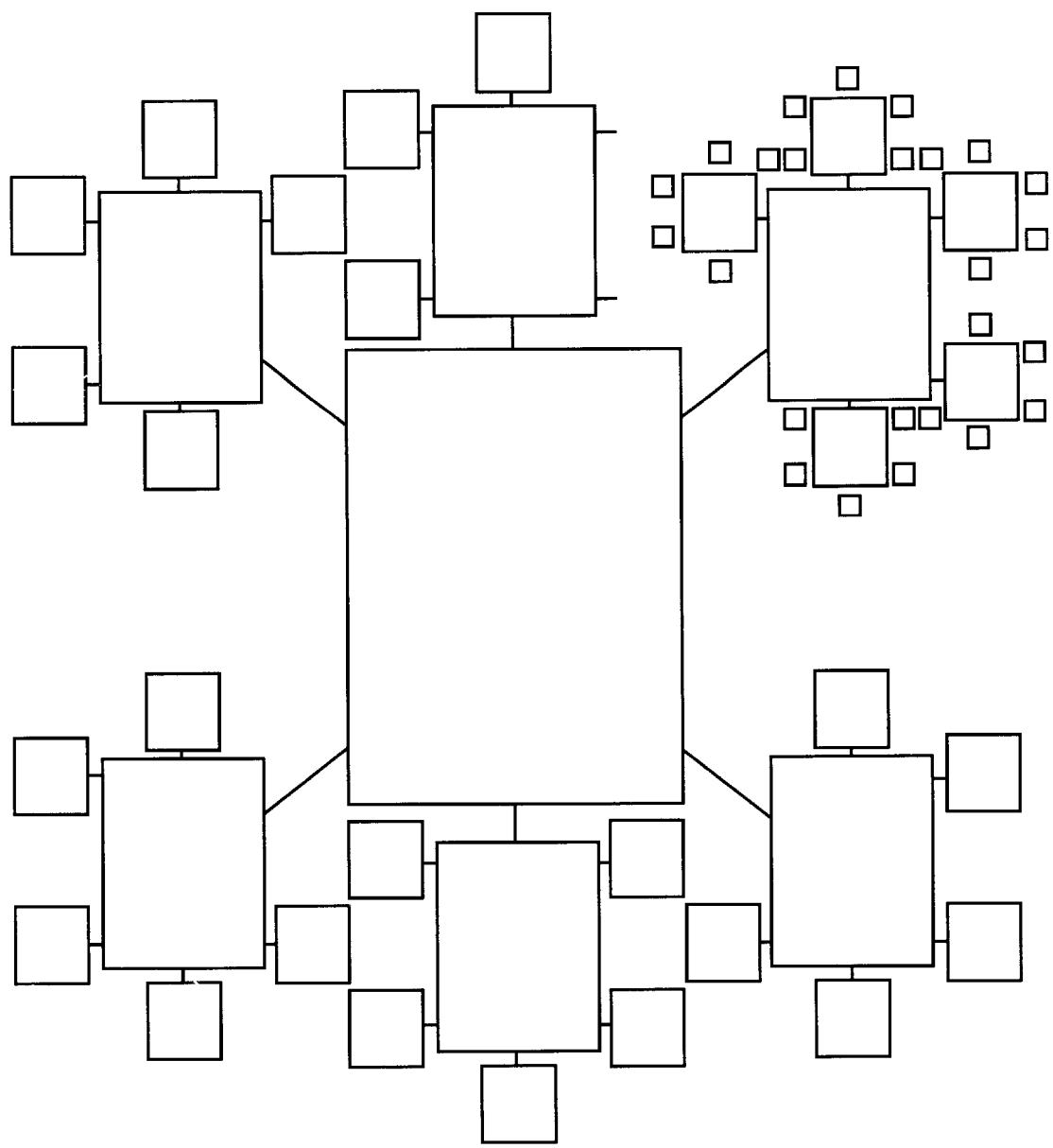
FIG. 5 shows an example of a browser interface based on a triple linearization.

FIG. 5 shows an example of a browser interface based on a triple linearization. In one embodiment, the images above and below an image are the nearest neighbors based on a first linearization. Two other images may correspond to nearest neighbors based on a second linearization, and the remaining two images may correspond to nearest neighbors based on a third linearization. In other embodiments, more linearizations may be added, and a mixture of linearizations based on different methods is possible.

Figure 6:
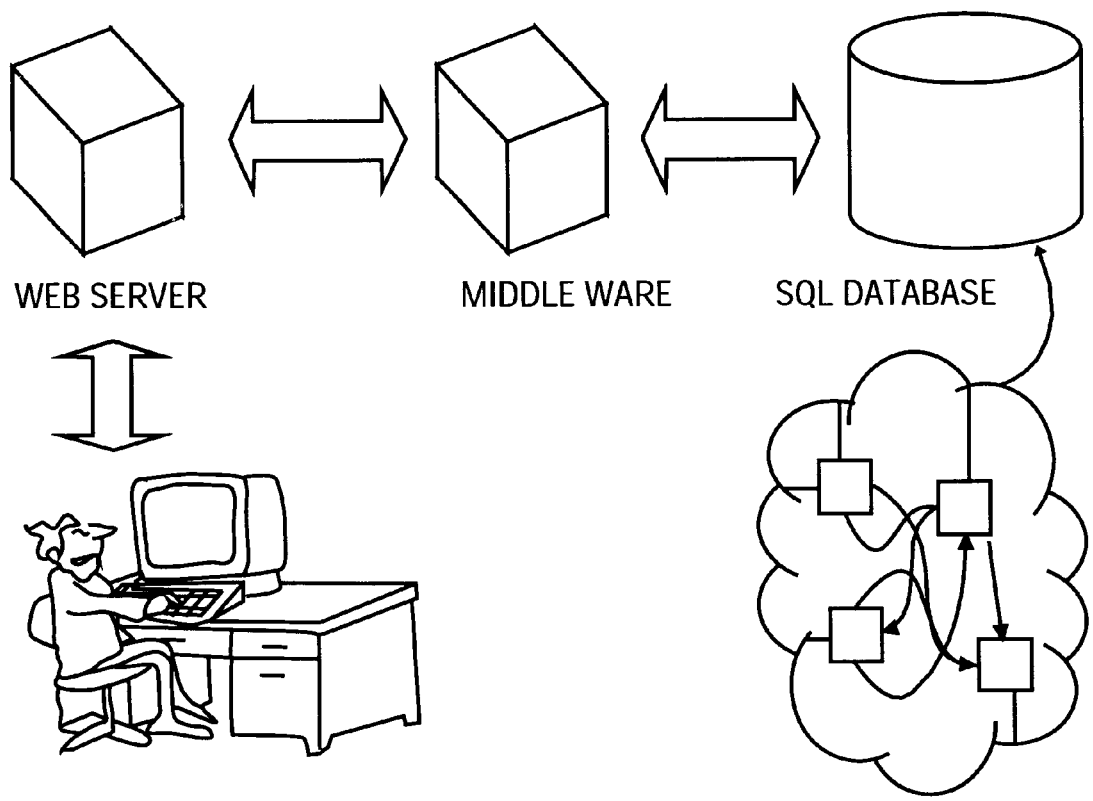
FIG. 6 shows an example of a system implemented on an SQL server that communicates with a middleware server to construct and serve web pages to an end user.

FIG. 6 shows an example of a system implemented on an SQL server that communicates with a middleware server to construct and serve web pages to an end user. The SQL server maintains the data structure of the multiple linearizations. The web server allows easy selection of the target image from any of the displayed images. When one of the images is selected, it becomes the target image, and the nearest neighbor and next-nearest neighbor images are updated correspondingly.

Thus, a system and method for using multiple linearizations for image browsing is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

The method steps of FIG. 1 may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Further, the methods described herein may be embodied in a hardware device such as a printed circuit board comprising discrete logic, integrated circuits, or specially designed application specific integrated circuits (ASIC).

What is claimed is:

1. A method for displaying images on a display comprising:

displaying a target image;

displaying a plurality of nearest neighbors proximate the target image, wherein the nearest neighbors are displayed as smaller in size than the target image; and displaying a plurality of next nearest neighbors proximate the target image, wherein the next nearest neighbors are displayed as smaller in size than the nearest neighbors.

2. The method of claim 1, further comprising displaying the target image between a first nearest neighbor and a second nearest neighbor, wherein the first nearest neighbor is associated with a position close to a position associated with the target image in a first ordering of images and the second nearest neighbor is associated with a position close to the position associated with the target image in the first ordering of images.

3. The method of claim 2, further comprising displaying the target image between a third nearest neighbor and a fourth nearest neighbor, wherein the third nearest neighbor is associated with a position close to a position associated with the target image in a second ordering of images and the fourth nearest neighbor is associated with a position close to the position associated with the target image in the second ordering of images.

4. The method of claim 2, further comprising displaying a nearest neighbor between a next nearest neighbor and the target image, wherein the next nearest neighbor is associated with a position close to a position associated with the nearest neighbor in the first ordering of images and the target image is associated with the position close to the position associated with the nearest neighbor in the first ordering of images.

5. The method of claim 2, further comprising displaying a nearest neighbor between a first next nearest neighbor and a second next nearest neighbor, wherein the first next nearest neighbor is associated with a position close to a position associated with the nearest neighbor in the first ordering of images and the second next nearest neighbor is associated with a position close to the position associated with the nearest neighbor in the first ordering of images.

6. The method of claim 2, further comprising displaying the target image between a first next nearest neighbor and a second next nearest neighbor, wherein the first next nearest neighbor is associated with a position close to the position associated with the target image in the first ordering of images and the second next nearest neighbor is associated with a position close to the position associated with the target image in the first ordering of images.

7. The method of claim 6, further comprising displaying the target image between a third next nearest neighbor and a fourth next nearest neighbor, wherein the third next nearest neighbor is associated with a position close to a position associated with the target image in a second ordering of images and the fourth next nearest neighbor is associated with a position close to the position associated with the target image in the ordering of images.

8. The method of claim 1, wherein:
displaying the target image includes displaying a target image having a right side, a left side, a top side, and a bottom side;
displaying the plurality of nearest neighbors includes displaying a nearest neighbor to the right of the right side, a nearest neighbor to the left of the left side, a nearest neighbor above the top side, and a nearest neighbor below the bottom side; and
displaying the plurality of next nearest neighbors includes displaying a next nearest neighbor to the right of the right side, a next nearest neighbor to the left of the left side, a next nearest neighbor above the top side, and a next nearest neighbor below the bottom side.

9. The method claim 1, wherein displaying the plurality of ordered images includes displaying the plurality of ordered images so that a shape of the arrangement of the images is substantially symmetrical about at least one line.

10. The method of claim 1, wherein displaying the plurality of nearest neighbors includes displaying an even number of nearest neighbors.

11. The method of claim 1, wherein displaying a plurality of next nearest neighbors includes displaying an odd number of next nearest neighbors around each nearest neighbor.

12. A machine-readable medium having stored thereon data representing sequences of instructions that if executed cause a machine to display images on a display by performing operations comprising:
displaying a target image;
displaying a plurality of nearest neighbors proximate the target image, wherein the nearest neighbors are displayed as smaller in size than the target image; and
displaying a plurality of next nearest neighbors proximate the target image, wherein the next nearest neighbors are displayed as smaller in size than the nearest neighbors.

13. The machine-readable medium of claim 12, wherein the instructions for displaying the target image and displaying the plurality of nearest neighbors further comprise instructions causing the machine to display the target image between a first nearest neighbor and a second nearest neighbor, the first nearest neighbor associated with a position close to a position associated with the target image in a first ordering of images and the second nearest neighbor associated with a position close to the position associated with the target image in the first ordering of images.

14. The machine-readable medium of claim 12:
wherein the instructions for displaying the target image further comprise instructions causing the machine to perform operations comprising displaying a target image having a right side, a left side, a top side, and a bottom side;
wherein the instructions for displaying the plurality of nearest neighbors further comprise instructions causing the machine to perform operations comprising displaying a nearest neighbor to the right of the right side, a nearest neighbor to the left of the left side, a nearest neighbor above the top side, and a nearest neighbor below the bottom side; and
wherein the instructions for displaying the plurality of next nearest neighbors further comprise instructions causing the machine to perform operations comprising displaying a next nearest neighbor to the right of the right side, a next nearest neighbor to the left of the left side, a next nearest neighbor above the top side, and a next nearest neighbor below the bottom side.

15. The machine-readable medium of claim 12, wherein the instructions for displaying the plurality of ordered images further comprise instructions causing the machine to perform operations comprising displaying the plurality of ordered images so that a shape of the arrangement of the images is substantially symmetrical about at least one line.

16. A display comprising:
a target image;
a plurality of nearest neighbors proximate the target image, wherein the nearest neighbors are displayed as smaller in size than the target image; and
a plurality of next nearest neighbors proximate the target image, wherein the next nearest neighbors are displayed as smaller in size than the nearest neighbors.

17. The display of claim 16, wherein the target image is displayed between a first nearest neighbor and a second nearest neighbor, the first nearest neighbor associated with a position close to a position associated with the target image in a first ordering of images and the second nearest neighbor associated with a position close to the position associated with the target image in the first ordering of images.

18. The display of claim 16, wherein the target image is displayed between a third nearest neighbor and a fourth nearest neighbor, the third nearest neighbor associated with a position close to a position associated with the target image in a second ordering of images and the fourth nearest neighbor associated with a position close to the position associated with the target image in the second ordering of images.

19. The display of claim 16, wherein a nearest neighbor is displayed between a next nearest neighbor and the target image, the next nearest neighbor associated with a position close to a position associated with the nearest neighbor in the first ordering of images and the target image associated with the position close to the position associated with the nearest neighbor in the first ordering of images.

20. The display of claim 16, wherein a nearest neighbor is displayed between a first next nearest neighbor and a second next nearest neighbor, the first next nearest neighbor associated with a position close to a position associated with the nearest neighbor in the first ordering of images and the second next nearest neighbor associated with a position close to the position associated with the nearest neighbor in the first ordering of images.

21. The display of claim 16, wherein the target image is displayed between a first next nearest neighbor and a second next nearest neighbor, the first next nearest neighbor associated with a position close to the position associated with the target image in the first ordering of images and the second next nearest neighbor associated with a position close to the position associated with the target image in the first ordering of iages.

22. The display of claim 21, wherein the target image is displayed between a third next nearest neighbor and a fourth next nearest neighbor, the third next nearest neighbor associated with a position close to a position associated with the target image in a second ordering of images and the fourth next nearest neighbor associated with a position close to the position associated with the target image in the second ordering of images.

23. The display of claim 16, the shape of an arrangement of the plurality of ordered images is substantially symmetrical about at least one line.

24. The display of claim 16, wherein the plurality of nearest neighbors is an even number of nearest neighbors.

25. The display of claim 16, wherein the display includes an odd number of nearest neighbors around a nearest neighbor.

26. A computer system comprising:
    a storage device to store instructions to display a plurality of images, the storage device including instructions to:
        display a target image;
        display a plurality of nearest neighbors proximate the target image, wherein the nearest neighbors are displayed as smaller in size than the target image; and
        display a plurality of next nearest neighbors proximate the target image, wherein the next nearest neighbors are displayed as smaller in size than the nearest neighbors;
    a processor to execute the instructions; and
    a display to display the target image, the plurality of nearest neighbors, and the plurality of next nearest neighbors.

27. The computer system of claim 26, wherein the storage device further stores instructions to display the target image between a first nearest neighbor and a second nearest neighbor, the first nearest neighbor associated with a position close to a position associated with the target image in a first ordering of images and the second nearest neighbor associated with a position close to the position associated with the target image in the first ordering of images.

28. The computer system of claim 26, wherein the storage device further stores instructions to display a nearest neighbor between a next nearest neighbor and the target image, the next nearest neighbor associated with a position close to a position associated with the nearest neighbor in the first ordering of images and the target image associated with the position close to the position associated with the nearest neighbor in the first ordering of images.

29. The computer system claim 26, wherein the storage device further stores instructions to display the plurality of ordered images so that a shape of the arrangement of the plurality of images is substantially symmetrical about at least one line.

30. The computer system of claim 26, wherein the storage device further stores instructions to display an even number of nearest neighbors.

* * * * *